United States Patent

McCabe

[15] 3,664,379
[45] May 23, 1972

[54] MULTIPLE-LAYER VESSEL WITH CRACK ARRESTING WELDED JOINT

[72] Inventor: John Stanton McCabe, Naperville, Ill. 60540

[73] Assignee: Chicago Bridge & Iron Company, Oak Brook, Ill.

[22] Filed: June 2, 1970

[21] Appl. No.: 42,680

[52] U.S. Cl.............................138/143, 29/481, 138/151, 138/171, 220/3
[51] Int. Cl.............................................F16l 9/02
[58] Field of Search.....................29/481, 487; 113/120 S; 138/142, 143, 151, 156, 170, 171; 220/3, 75

[56] References Cited

UNITED STATES PATENTS

| 2,124,850 | 7/1938 | Drake | 29/481 |
| 3,431,949 | 3/1969 | Uto et al. | 138/143 |
| 3,457,961 | 7/1969 | Long | 138/143 |

FOREIGN PATENTS OR APPLICATIONS

| 116,868 | 4/1943 | Australia | 220/3 |

Primary Examiner—Laverne D. Geiger
Assistant Examiner—Edward J. Earls
Attorney—Merriam, Marshall, Shapiro & Klose

[57] ABSTRACT

A multiple-layer vessel having an inner shell over which a filler or dummy layer is wrapped. The edges of the filler or dummy layer are left unjoined and with a gap between them. The gap can be longitudinal or circumferential with respect to the longitudinal axis of the vessel. A load-bearing layer is placed around the filler layer. The adjacent edges of the load-bearing layer are welded together and to the filter layer. The area of intersection in which the welded joint of the load-bearing layer crosses the gap in the filler layer is cut-out at least to the full thickness of the load-bearing layer to provide a mechanical discontinuity or crack arrester. The cut-out area extends at least partially into the filler layer.

7 Claims, 10 Drawing Figures

PATENTED MAY 23 1972 3,664,379

INVENTOR
John S. McCabe
BY Merriam, Marshall, Shapiro & Keane
ATTORNEYS

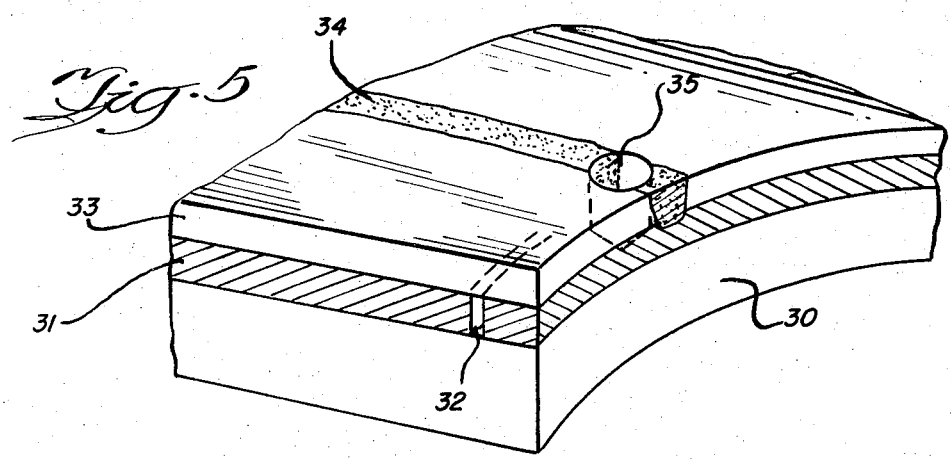
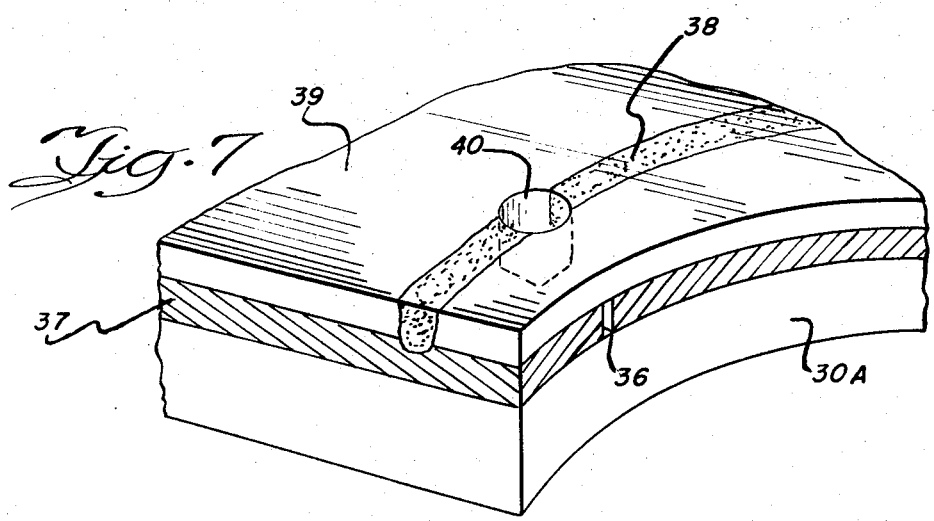
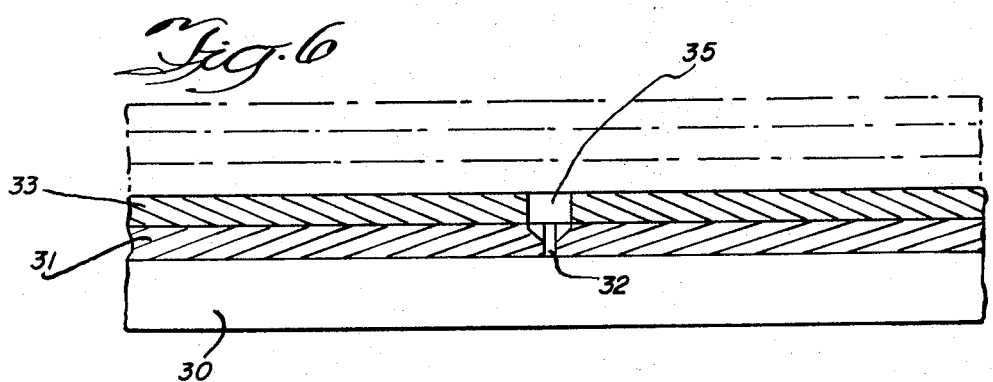

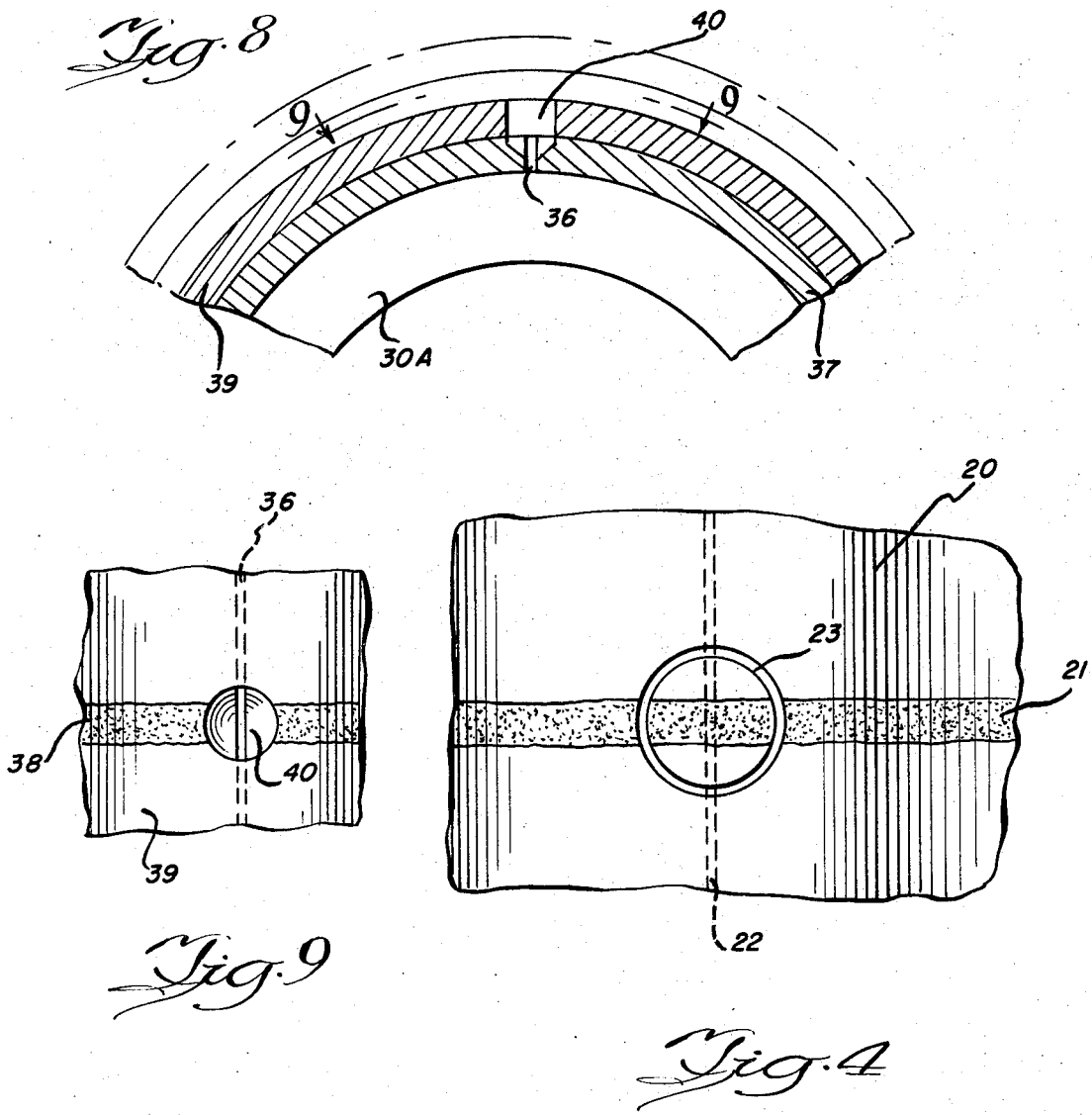

MULTIPLE-LAYER VESSEL WITH CRACK ARRESTING WELDED JOINT

This invention relates to apparatus made of laminated metal sheets or plates. More particularly, this invention is concerned with improvements in multiple-layer structures, such as vessels and similar equipment used in various processing and chemical reactions.

Many vessels and similar structures used in industrial processes must be able to withstand exceedingly high pressures. Although such vessels can be made of a single thickness of metal plate, for some applications it is generally more economical and sometimes a practical or even metallurgical necessity to fabricate such vessels by wrapping a plurality of layers of metal plate or metal sheet around an inner shell or central core. Such vessels are normally referred to in the art as multiple-layer vessels. The number of load-bearing metal layers and their thickness used in fabricating a multiple-layer vessel are calculated to give the desired strength with due regard to the economics of fabrication, welding, and forming of the layers, one upon the other, in building up the vessel as well as the size and strength of the inner shell used as the starting structure.

It is sometimes advisable, and often necessary, to use an inner shell made of a special alloy or metal which is capable of withstanding the environmental conditions to which it will be subjected in use. Many such special alloys and metals, however, require that they not be subjected to localized heating, as often results from the welding of joints as each layer is applied in building up the multiple layer wall of the vessel. Such localized heating is unavoidable when the first layer applied around the inner shell is a load-bearing layer since it usually would require that the adjacent edges of the metal sheet or plate forming the layer be joined together by welding, using the inner shell to back-up the weld. Excessive heating of the inner shell and even simultaneous welding of it to the load-bearing layer would be unavoidable using the inner shell as the back-up. This problem would be present both in longitudinal welded joints and in circumferential joints where the edges of adjoining ends of metal sheets or plates are used to form the same layer of an unusually long vessel. To avoid welding into the inner shell and to prevent heating it excessively it is common practice to apply a dummy or filler layer over and in contact with the inner shell before the first load-bearing layer is applied. The filler layer is not welded to the inner shell. Metallurgical damage or changes in the inner shell are thus avoided since the next layer, which is a load-bearing layer, can have longitudinal or circumferential welded joints which extend for the full thickness of such load-bearing layer and into the filler layer without adversely affecting the inner shell, since the heat and welds penetrate only into the metal of the filler layer and do not adversely affect the inner shell.

For multiple-layer vessels in hydrogen service, the filler layer can be used to collect hydrogen penetrating through the inner shell and to allow venting. In nuclear vessels, the filler layer can be used to monitor the inner shell through a system of passageways for possible leakage. The filler layer can also be made of a special material to absorb neutrons or gamma rays. There are thus many uses for a filler layer unbonded to the inner shell.

In fabricating a multiple-layer vessel using a filler layer as described, it is common practice for the adjacent edges of the sheet or sheets comprising the filler layer to be placed in closely-spaced relationship to each other, forming slight varying gaps between the edges. Such gaps generally are located longitudinal to the axis of the multiple-layer vessel being fabricated or circumferentially as where the filler layer is made up of two or more sheets or plates positioned end-to-end. In applying the load-bearing layer, the longitudinal welded joints cross laterally over the circumferential gaps in the filler layer, and the circumferential joints in the load-bearing layer cross laterally over longitudinal gaps in the filler layer. In the areas where the welded joints of the load-bearing layer cross over the unwelded gaps of the filler layer, points of non-fusion result and these points may be crack starters allowing cracks to propagate into the load-bearing layer. This is highly undesirable because crack development seriously weakens the load-bearing layer strength and, if this happens in a substantial number of the layers of the vessel, it would not be able to withstand the pressures for which it was built. A need therefore exists for multiple-layer vessels which are devoid of structural characteristics which would permit the initiation of cracks at the areas of intersection of welded joints in a load-bearing layer with gaps between edges of a filler layer. This need is met by the subject invention and of course other advantages will be apparent to those skilled in the art to whom this invention is disclosed.

According to the present invention there is provided a multiple-layer vessel having an inner shell over which a filler or dummy layer is wrapped around and in contact with the inner shell. The edges of the filler or dummy layer are closely spaced to each other, but are left unjoined and with a gap between them. The gap can be longitudinal or circumferential with respect to the longitudinal axis of the vessel. A load-bearing layer is placed around and in contact with the filler layer. The adjacent edges of the load-bearing layer are welded together and to the filler layer by a welded joint running lateral to any intersecting gap in the filler layer. The area of intersection in which the welded joint of the load-bearing layer crosses over the gap in the filler layer is cut-out at least to the full thickness of the load-bearing layer and provides a mechanical discontinuity or crack arrester. The cut-out area is at least as wide as the welded joint and the gap, and advisably the cut-out area is slightly wider than the welded joint and the gap. Furthermore, the cut-out area also advisably extends partially into the filler layer.

The invention will now be described further in conjunction with the attached drawings, in which:

FIG. 4 is a plan view showing a ring-like cut-out surrounding the intersection of a circumferential welded joint in a load-bearing layer directly over a filler layer having a longitudinal gap;

FIG. 5 is an isometric view of a wall portion of a multiple-layer vessel showing a filler layer with a circumferential gap and a load-bearing layer placed thereover with a longitudinal welded joint;

FIG. 6 is a longitudinal sectional view along the weld of the wall portion shown in FIG. 5 with a drilled-out area at the intersection of the welded joint with the gap in the filler layer;

FIG. 7 is an isometric view of a wall portion of a multiple-layer vessel showing a filler layer with a longitudinal gap and a load-bearing layer placed thereover having a circumferential welded joint;

FIG. 8 is a cross sectional view through the wall portion shown in FIG. 7 taken along the line of the welded joint;

FIG. 9 is a plan view of the cut-out area shown in FIGS. 7 and 8; and

So far as is practical, the same elements or structures which appear in the different views will be identified by the same numbers. Furthermore, while the figures of the drawings all have reference to a vessel having a multiple-layer cylindrical body portion, it should be understood that the invention has wider applicability and can be used on double-curved surfaces as well including dished or spherical segments.

Figure 1:
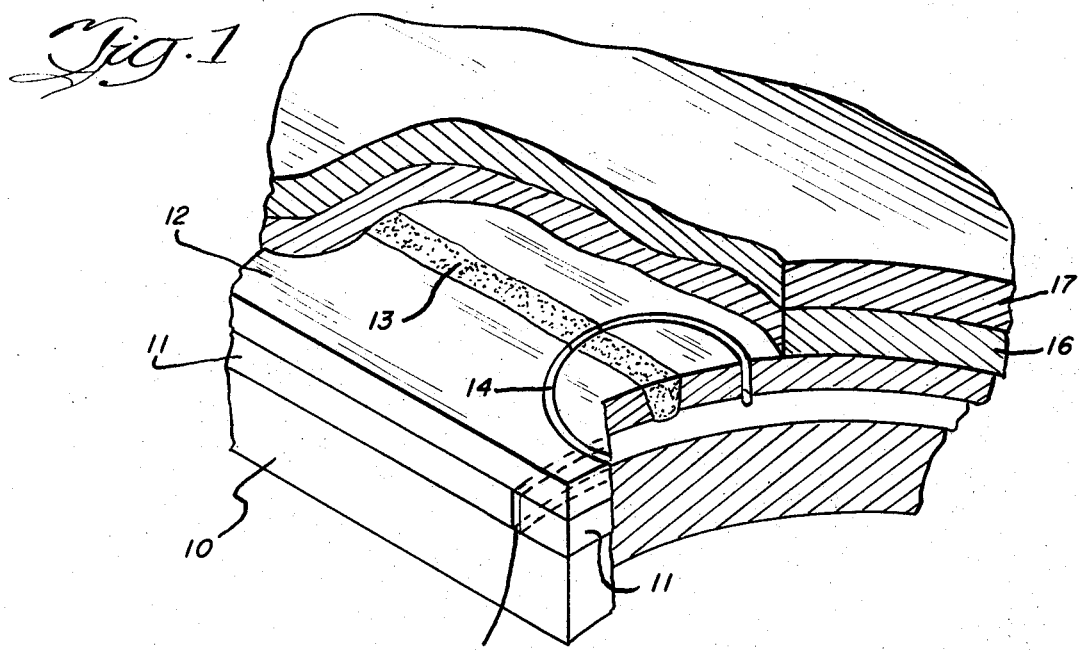
FIG. 1 is an isometric view partially in section and partially cut away showing a wall portion of a multiple-layer vessel having an inner shell, a filler layer and three working layers thereover.
Figure 2:
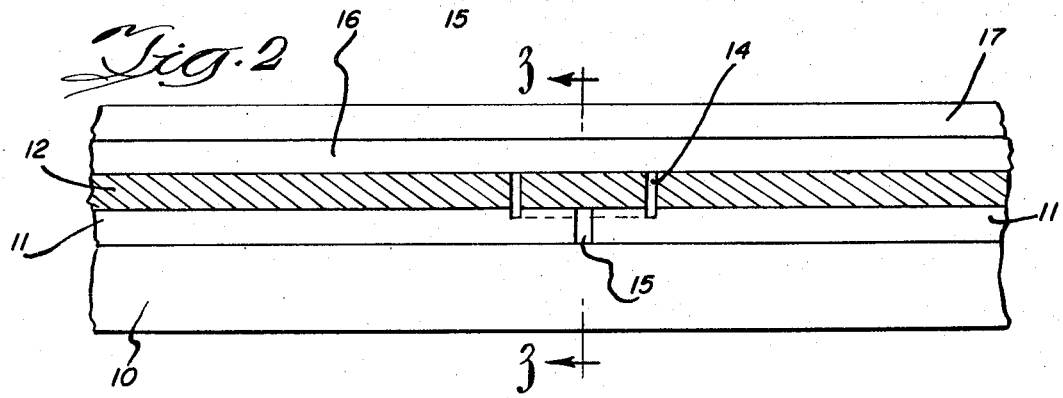
FIG. 2 is a longitudinal sectional view through the multiple-layer vessel wall of FIG. 1 along the line of the weld.
Figures 3, 10:
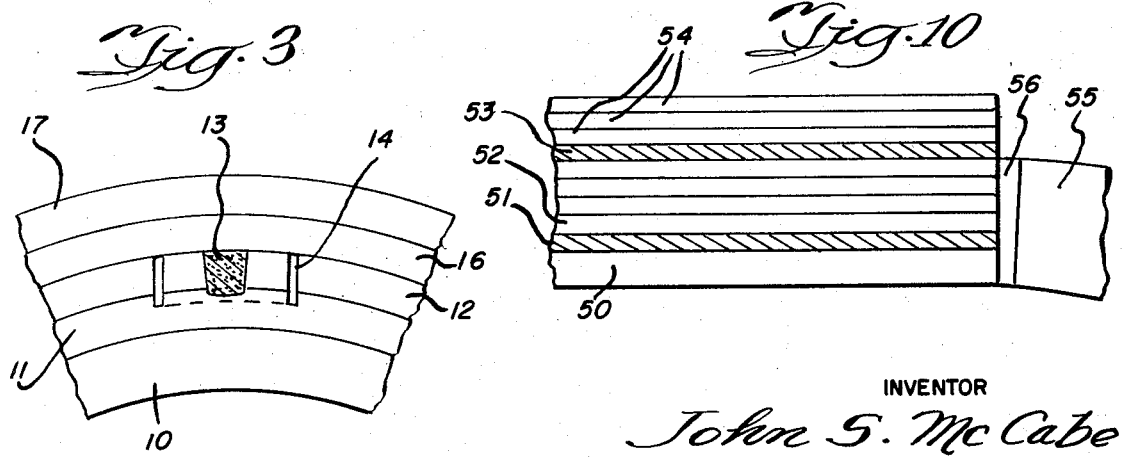
FIG. 3 is an end sectional view along the line 3—3 of FIG. 2.
FIG. 10 is a cross sectional view through the end of a walled vessel having a double filler layer separated by load-bearing layers.

With reference to FIGS. 1 to 3, there is shown in these drawings a wall portion of a multiple-layer vessel in which the main body thereof is an elongated hollow cylinder. The wall has an inner shell over which filler plate 11 is tightly pressed.

Filler plate 11 is shown made of two or more separate sheets or plates with a gap 15 circumferentially located between adjacent edges thereof. Load-bearing layer 12 is wrapped tightly around the filler or dummy layer 11. The edges of load-bearing layer 12 are located longitudinal to the axis of the vessel, but are spaced apart from one another a small distance so as to facilitate deposition of weld 13 which extends for the length of the load-bearing layer 12 and crosses over gap 15 between the sheets comprising filler layer 11. Circular groove 14 extends through the thickness of load-bearing layer 12, and advisably partially into filler layer 11. The circular groove 14 is of such size as to at least circumscribe completely an area equal to the width of weld 13 and the width of gap 15 to thereby eliminate possible propagation of cracks in load-bearing layer 12. Any crack induced in the disc inside of groove 14 by the unwelded gap 15 cannot propagate into the remainder of the layer or the weld. After circular groove 14 is cut in place additional load-bearing layers 16 and 17 can be put in place, if desired, according to conventional procedures. Of course, more load-bearing layers than this can be applied if required.

The joint structure of FIG. 4 illustrates a load-bearing layer 20 in two pieces joined together by a welded joint 21 which runs circumferentially around the wall and crosses longitudinal gap 22 formed by edges of a filler layer immediately therebelow. Thus, gap 22 in the filler layer of the wall of FIG. 4 runs longitudinally to the axis of the vessel rather than circumferentially as does gap 15 in FIG. 1. Both directions in which gaps 15 and 22 run are those normally encountered in the fabrication of multiple-layer vessels employing a filler layer. Propagation of possible cracks in the area where circumferential weld 21 passes over longitudinal gap 22 in the filler layer is prevented by the circular groove 23 which penetrates at least the full thickness of the load-bearing layer 20 and advisably slightly into the filler layer immediately therebelow. Groove 23 is made of such width that its periphery completely encompasses the area where weld 21 crosses gap 22.

With reference to FIGS. 5 and 6, inner cylindrical shell 30 is surrounded by filler layer 31 which has a circumferential gap 32 between the two sections of which it is composed. Immediately on top of filler layer 31 is load-bearing layer 33 positioned in direct contact therewith. The opposing edges of load-bearing layer 33 are positioned longitudinally with respect to the axis of the vessel and in slightly spaced apart position so that they can be and are readily joined by weld 34 which slightly penetrates into filler layer 31 and continues across gap 32. The area where weld 34 crosses gap 32 is drilled out to make a cut-out area or hold 35 which penetrates entirely through load-bearing layer 33 and slightly into filler layer 31 at the location of gap 32. The size of hole 35 is such that its diameter is at least as large as the width of weld 34, where it is located, and advisably slightly larger than the weld in order to avoid any likelihood of possible cracks propagating into load-bearing layer 33. Hole 35 is also at least as wide as gap 32 and advisably slightly larger for the same reason.

With reference to FIGS. 7 and 9, inner cylindrical shell 30A has filler layer 37 thereover. Gap 36 in the filler plate is longitudinally positioned, and weld 38 in load-bearing plate 39 is circumferentially located. Hole or cut-out area 40 drilled into and through the weld 38 partially into filler layer 37 prevents crack propagation in the area where weld 38 crosses gap 36.

It is not necessary that the filled layer described be located immediately next to the inner shell. More than one filler layer may be employed. The wall portion of a multiple-layer vessel shown in FIG. 10 employs two filler layers. Thus, inner shell 50 has filler layer 51 followed by a series of load-bearing layers 52, then a second filler layer 53 and over it load bearing layers 54. Semispherical head 55 is welded 56 to the end of the cylindrical portion of the vessel as described previously. Cut out areas are made in the load-bearing layers in contact with the filler layer therebelow in the areas of intersection of welded joints in the load-bearing layers and the gaps in the filler layers to prevent crack propagation. By placing filler layer 53 outside of the joint 56 which joins head 55 to part of the vessel wall, longitudinal stresses imposed by the head are prevented from being applied to the load-bearing layers 54.

Although the invention described herein employs circular holes or cuts, it is not the purpose of the invention to limit the configuration of the discontinuity made in the layer adjacent to the filler layer. Drills, saws, grinders or any other metalworking equipment can be employed to produce holes, cutouts or slots that are smoothly curved and which can be circular, oval or irregular in shape.

What is claimed is:

1. A multiple-layer vessel comprising:
   an inner shell;
   a filler or dummy layer, around and in contact with the inner shell, with adjacent but closely spaced apart unjoined edges defining a gap between the edges;
   a load bearing layer, around and in contact with the filler layer, having adjacent edges welded together and to the filler layer forming a joint running lateral to the gap in the filler layer and intersecting said gap at at least one point; and
   a cut-out area in the welded joint, in the load bearing layer, at the point of intersection of said joint with said gap, said cut-out area being wider than the said weld and the width of the gap in the filler layer, said cut-out extending at least the full thickness of the load bearing layer.

2. A multiple-layer vessel according to claim 1 in which the cut-out area extends partially into the filler layer.

3. A multiple-layer vessel according to claim 1 in the form of a cylinder.

4. A multiple-layer vessel according to claim 3 in which the filler layer gap is circumferential and the load bearing layer weld is longitudinal.

5. A multiple-layer vessel according to claim 3 in which the filler layer gap is longitudinal and the load bearing layer weld is circumferential.

6. A multiple-layer vessel according to claim 1 in which at least one additional load bearing layer is positioned over the load bearing layer in contact with the filler layer.

7. A multiple-layer vessel according to claim 6 having a second filler layer in contact with a load bearing layer therebeneath and a load bearing layer therearound having a welded joint lateral to a gap in the second filler layer and a cut-out area in the welded joint at least as wide as the joint and the said gap.

* * * * *